(12) United States Patent
Choi

(10) Patent No.: US 6,473,129 B1
(45) Date of Patent: Oct. 29, 2002

(54) METHOD FOR PARSING EVENT INFORMATION TABLE

(75) Inventor: Kyung Rok Choi, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,264

(22) Filed: Dec. 30, 1999

(30) Foreign Application Priority Data

Dec. 31, 1998 (KR) .............................................. 98-62838

(51) Int. Cl.[7] .............................. H04N 5/46; H04N 5/50; H04N 5/445; H04N 7/10
(52) U.S. Cl. ........................ 348/465; 348/558; 348/563; 348/569; 348/906; 725/50; 725/54; 725/56
(58) Field of Search ................................. 348/460–469, 348/558, 906, 563, 569, 570, 423.1, 425.1; 375/240.1; 725/39, 40, 56, 54, 50

(56) References Cited

U.S. PATENT DOCUMENTS

| | | | | |
|---|---|---|---|---|
| 5,289,276 A | * | 2/1994 | Siracusa et al. | ............. 348/467 |
| 5,600,378 A | * | 2/1997 | Wasilewski | ................. 348/468 |
| 6,031,577 A | * | 2/2000 | Ozkan et al. | ................ 348/465 |
| 6,040,850 A | * | 3/2000 | Un et al. | ........................ 725/68 |
| 6,111,161 A | * | 8/2000 | Ozkan et al. | ................ 348/465 |
| 6,111,162 A | * | 8/2000 | Ozkan et al. | ................ 348/465 |
| 6,115,074 A | * | 9/2000 | Ozkan et al. | ................ 348/465 |
| 6,134,554 A | * | 10/2000 | Freimann et al. | ........... 707/100 |
| 6,151,078 A | * | 11/2000 | Yoneda et al. | .............. 348/558 |
| 6,249,320 B1 | * | 6/2001 | Schneidewend et al. | .... 348/569 |
| 6,271,886 B1 | * | 8/2001 | Nishina et al. | ............. 348/460 |
| 6,313,886 B1 | * | 11/2001 | Sugiyama | ................... 348/731 |

* cited by examiner

*Primary Examiner*—John Miller
*Assistant Examiner*—Paulos M. Natnael
(74) *Attorney, Agent, or Firm*—Birch, Stewart, Kolasch & Birch, LLP

(57) ABSTRACT

A method for parsing EIT parsing and providing program specific information of broadcasting programs at a rapid speed. The method includes the steps of: extracting the EITs from a program specific information signal sequence in a transport stream packet transmitted from a broadcasting station; parsing each the EIT in a prescribed priority order in the EITs; and displaying the parsed EIT on a TV screen. The method for parsing EIT according to the present invention can provide the information on the broadcasting program on the time period when an audience rating is highest to a viewer at a more rapid speed than the conventional EIT parsing method.

20 Claims, 7 Drawing Sheets

FIG.3

Background Art

| Full Program Information | 1998/06/30 18:00 |

What's your choice?

NBC-Movie   Channel 24
Title    Lost World-Jurassic Park 2
Actor/Actress    Sam Niele/Julian Moore
Category    Movie/Action Adventure
Start/End Time    17:30~20:00
Rating    PG-Parental Guide Needed
Aspect    Ratio Wide-16:9
Language    English(Stereo)/French(Mono)/Esp(Mono)

Synopsis

T-Rex is Back! Dinosaur is not fantasy any more. Spielberg makes you tremble at this time. Welcome to the horrible world!

Prev

Watch

Cancel

50

METHOD FOR PARSING EVENT INFORMATION TABLE

BACKGROUND OF THE INTENTION

1. Field of the Invention

The present invention relates to a TV, and more particularly, to a method for parsing an Event Information Table(hereinafter, referred to as 'EIT') and a TV using the same method.

2. Discussion of Related Art

A general digital TV receiver, as shown in FIG. 1, includes: a tuner 10 to which a broadcasting signal is received; an A/D converter 11 for converting the received broadcasting signal from the tuner 10 into a digital broadcasting data; a channel decoder 12 for detecting a pilot signal from the digital broadcasting data to detect a baseband signal and for performing an error correction for the detected signal; a microcomputer 20 for outputting a control signal in accordance with manipulation of a user; a TP analyzer 13 for analyzing a TP signal in the digital broadcasting signal outputted from the A/D converter 11 to detect audio/video signals under control of the microcomputer 20; an MPEG audio decoder 24 for decoding the audio signal analyzed in the TP analyzer 13; an MPEG video decoder 25 for decoding the video signal analyzed in the TP analyzer 13; a digital to analog converter(DAC) 30 for converting the digital audio signal decoded in the MPEG audio decoder 24 into an analog signal; a flash ROM 40 where channels and programs are stored; a RAM 41 where a temporary data is stored by the operation of the microcomputer 20; and an NTSC encoder 31 for converting the video signal decoded in the MPEG video decoder 25 into an image signal which is displayed on a TV or monitor. Further, an SDRAM 23 is necessary for data processing in the MPEG audio decoder 24 and the MPEG video decoder 25, and a user interface 21 and a CAS interface 22 are necessary for generation from the outside of an operation signal for the microcomputer 20.

Generally, the digital broadcasting processes the video signal and the audio signal under the standard of MPEG. Particularly, the MPEG standard number for the broadcasting system is ISO/IEC 13818-1, that for the video signal is ISO/IEC 13818-2, and that for the audio signal is ISO/IEC 13818-3. However, the digital TV receiver in U.S.A. does not use the audio signal under the MPEG system and processes it under the standard of DOLBY AC-3.

The tuner 10 receives a Quadrature Phase Shift Keying (QPSK) signal or a Quadrature Amplitude Modulation (QAM) signal from an antenna and detects and outputs the received signal. The detected signal in the tuner 10 is converted into an intermediate frequency band signal by means of an IF converter(not shown). This is because the detected signal in the tuner 10 is a high frequency signal in a great high frequency band, with which a driving circuit in the digital TV does not deal.

The channel decoder 12 detects the pilot signal in the intermediate frequency signal to detect the baseband signal and converts the baseband signal into a digital signal. Next, it performs a timing recovery appropriate to a symbol rate and then performs the error correction. The output signal of the channel decoder 12 is a transport stream packet type of signal sequence in a byte unit. FIG. 2 shows an exemplary view of a transport stream packet structure.

The transport signal sequence, which is standardized in the MPEG-2 system, is a time-multiplexed signal sequence, which is called "transport stream packet". The transport signal sequence contains a header on which a packet identifier(PID) number is recorded, on the starting of the packet. The PID number is utilized as the information with which the time-multiplexed signal is demultiplexed. Also, the PID number means the type of a current packet, and if the PID number is analyzed, it is checked whether the current packet is a video packet, an audio packet, or program specific information. Particularly, the digital TV standard in U.S.A. includes the program specific information, that is, a program and system information protocol(hereinafter, referred to as 'PSIP').

The PSIP is comprised of: a master guide table(MGT) where the versions of all broadcasting program tables are controlled; a terrestrial virtual channel table(TVCT) where the information for channels is stored; a rating region table(RRT) where a rating table of each program is listed; an event information table(EIT) for providing the information on the current broadcasting programs and future broadcasting programs; an extended text table(ETT) for providing the detailed information on the current broadcasting programs and future broadcasting programs; and a system time table (STT) for sending a current time.

The video and audio standard in the MPEG-2 system are in connection with the signal sequences of the compressed video and audio. Under the MPEG-2 standard, the video signal, the audio signal and the program specific information are all time-multiplexed and transmitted in several transport stream packets. And, the signal sequences thereof are all discriminated with the PID number.

The TP analyzer 13 analyzes the signal sequence in the transport stream packet with the PID number and applies the analyzed results to each decoders 24 and 25. In more detail, the TP analyzer 13 receives the transport signal sequence received in the tuner 10 and senses the PID number contained on the header of the corresponding signal sequence. Thus, the TP analyzer 13 performs demultiplexing through which the received transport signal sequence is divided into a video signal sequence, an audio signal sequence and a program specific information sequence in accordance with the sensed PID number. Thereby, the TP analyzer 13 applies the video signal sequence to the MPEG video decoder 25, the audio signal sequence to the MPEG audio decoder 24, and the program specific information sequence to the microcomputer 20.

The MPEG video decoder 25 decodes the video signal sequence applied from the TP analyzer 13 and outputs the decoded result to the NTSC encoder 31. The video signal sequence applied from the TP analyzer 13 is the compressed data in the MPEG-2 system. Therefore, the MPEG video decoder 25 uncompresses the video signal sequence to return to an original digital video data.

The MPEG audio decoder 24 decodes the audio signal sequence applied from the TP analyzer 13 and outputs the decoded result to the DAC 30. The audio signal sequence applied from the TP analyzer 13 is the compressed data in the MPEG-1 system. Therefore, the MPEG audio decoder 24 uncompresses the audio signal sequence to return to an original digital audio data.

The DAC 30 converts the digital audio signal applied from the MPEG audio decoder 24 into analog audio signals(R and L) which are processed in an amplifier or speaker. The analog audio signal is outputted as voice or sound by means of a stereo speaker(not shown)

The NTSC encoder 31 converts the digital video signal applied from the MPEG video decoder 25 into luminance and chrominance signals(Y and C) which are displayed on a general TV or monitor. The luminance and chrominance signals are displayed as video by means of a CRT(not shown).

The microcomputer 20 controls the operation of the digital TV receiver. The flash ROM 40 stores the program necessary for the control of the microcomputer 20, and the DRAM 41 stores the temporary information or data necessary upon the execution of the control operation of the microcomputer 20.

The digital TV under the above construction receives the program specific information signal sequence to provide various kinds of program specific information which is not obtained in an analog TV to a viewer. Particularly, the EIT is a very important information table containing various kinds of information such as starting time and broadcasting hour, title and grade, caption and the like in connection with programs currently broadcast and programs scheduled in the future. An example where such the EIT is embodied in the digital TV is shown in FIG. 2.

The EIT as shown in FIG. 2 is a kind of broadcasting program guide and is comprised of the title of a broadcasting program, the name of a broadcasting station, the broadcasting time of the program, and a current time. Specifically, the title of the broadcasting program and the broadcasting time of the program are displayed by means of the EIT program specific information signal sequence.

On the other hand, another example where such the EIT is embodied in the digital TV is shown in FIG. 3. The EIT as shown in FIG. 3 is program information, which unfolds detailed contents of the broadcasting program as shown FIG. 2. In other words, if a user selects any one of the broadcasting programs on the program guide in FIG. 2, the detailed information of the selected program is listed as shown in FIG. 3. As shown, the program information includes the title of program, story, broadcasting start and end time, the grade of program, language and so on.

The PSIP standard stated in the Advanced Television Systems Committee(ATSC) broadcasting standard defines the transmission of the EIT corresponding to three hours. In other words, the EIT according to the U.S. broadcasting standard is edited to contain the program specific information on the broadcasting programs corresponding to 0:00–03:00, 03:00–06:00, 06:00–09:00, 09:00–12:00, 12:00–15:00, 15:00–18:00, 18:00–21:00, and 21:00–24:00 hours, respectively. Since the number of the EITs to be sent is 128(EIT1–EIT127), if the digital TV analyzes all of the EITs, it stores the broadcasting program specific information corresponding to total 384 hours, that is, 16 days.

In parsing the EITs, however, the conventional digital TV encounters some problems as follows:

First, if the conventional digital TV is to build the specific information on the broadcasting program as shown in FIGS. 2 and 3, all EITs should be really parsed. However, if the 128 EITs are all sent and parsed, a memory capacity and microprocessor exceeding a general personal computer level should be prepared, which occurs a problem that the price of the body of the digital TV goes up drastically.

Secondly, since the EIT is sent in a period of rough 500 ms, there occurs a problem that the time taken for the conventional digital TV to receive all of the EITs and build the broadcasting program specific information is delayed to undesirably prolong the processing speed.

SUMMARY OF THE INVENTION

Accordingly, the present invention is directed to a method for parsing EIT that substantially obviates one or more of the problems due to limitations and disadvantages of the related arts.

An object of the invention is to provide a method for parsing EIT which is capable of parsing and providing program specific information on broadcasting programs at a rapid speed.

According to an aspect of the present invention, there is provided a method for parsing EIT which is capable of setting priority order to the EITs according to the prime time when an audience rating is highest or by channels and processing the EIT in the order of the set priority.

According to another aspect of the present invention, a method for parsing EIT comprises the steps of: extracting EITs from a program specific information signal sequence; parsing each EIT in a prescribed priority order in the EITs; and displaying the parsed EIT on a TV screen. At this time, the method for parsing the EIT further comprises the steps of: aligning the extracted EITs in the order of time; and setting the predetermined priority order to the aligned EITs.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

FIG. 3 is an exemplary view illustrating the detailed information on the broadcasting program provided to a viewer by the EIT of the program specific information signal sequence in a digital TV;

DETAILED DESCRIPTION OF PREFERRED EMBODIMENT

Reference will now be made in detail to the preferred embodiments of the present invention, examples of which are illustrated in the accompanying drawings.

Figure 1:
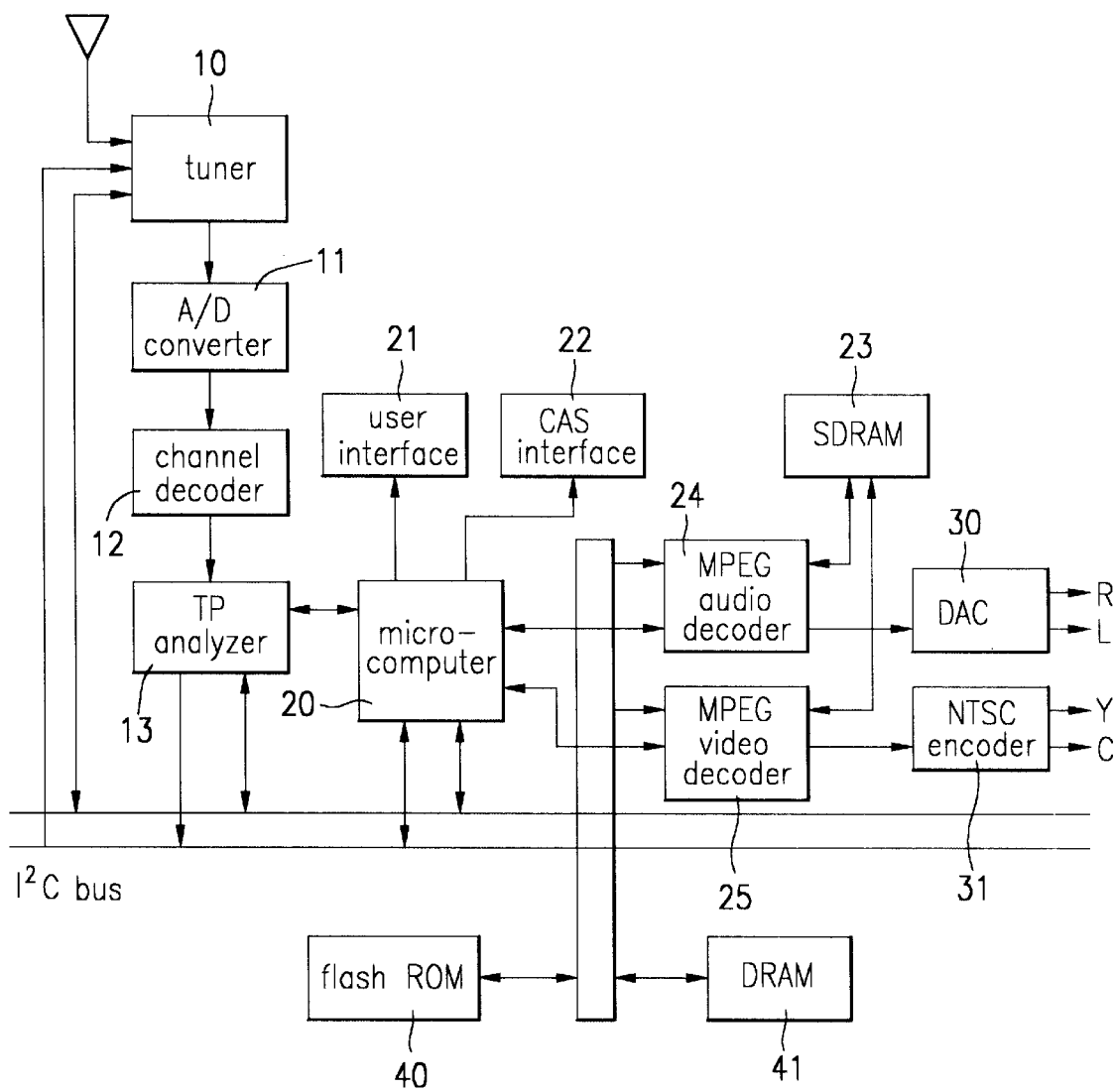
FIG. 1 is a schematic block diagram illustrating the internal circuit of a general digital TV receiver.
Figure 2:
FIG. 2 is an exemplary view illustrating a program guide screen provided to a viewer by the EIT of the program specific information signal sequence in a digital TV.
Figure 4:
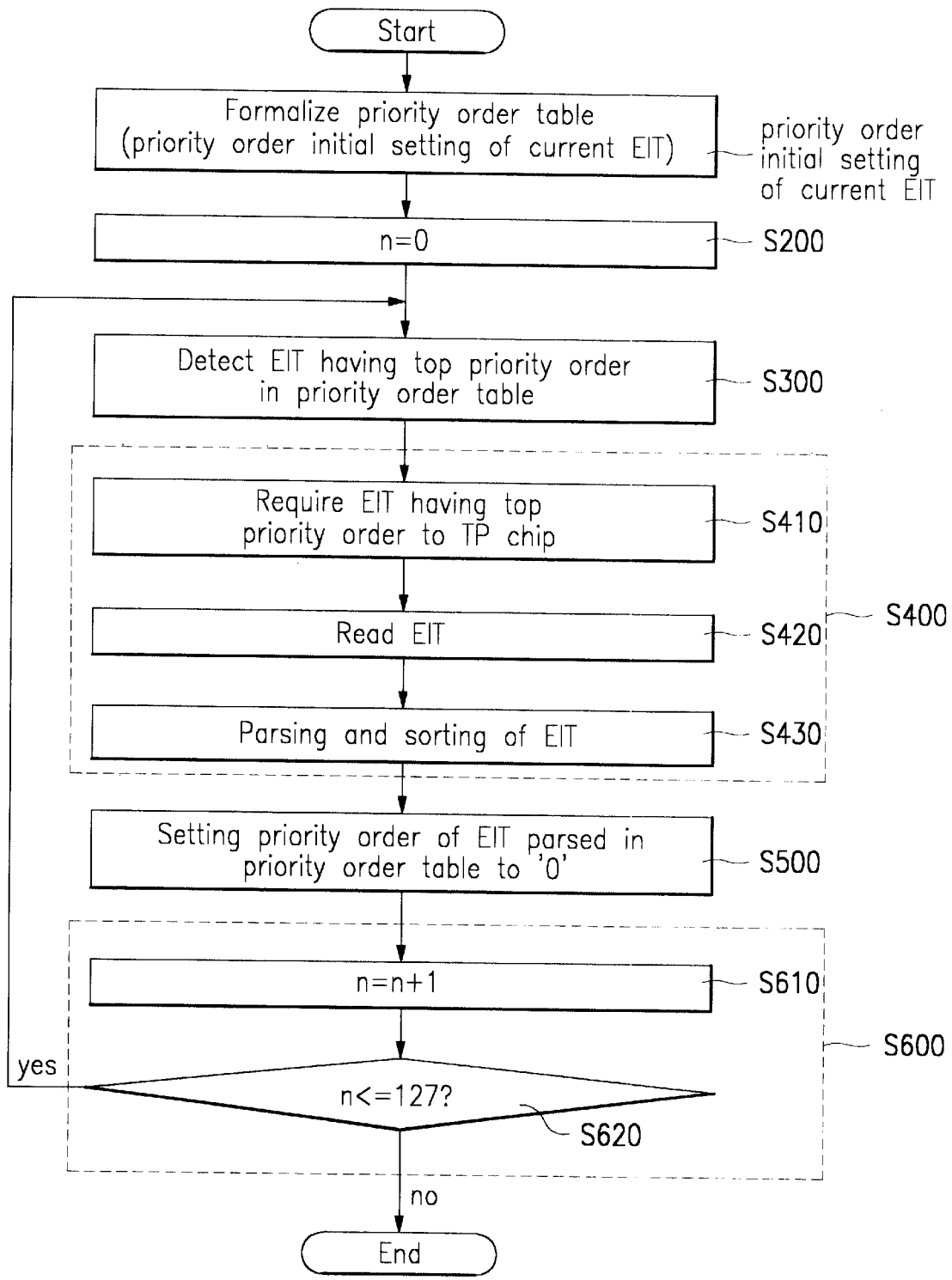
FIGS. 4 and 5 are flowcharts each illustrating a method for parsing EIT according to the present invention.
Figure 5:
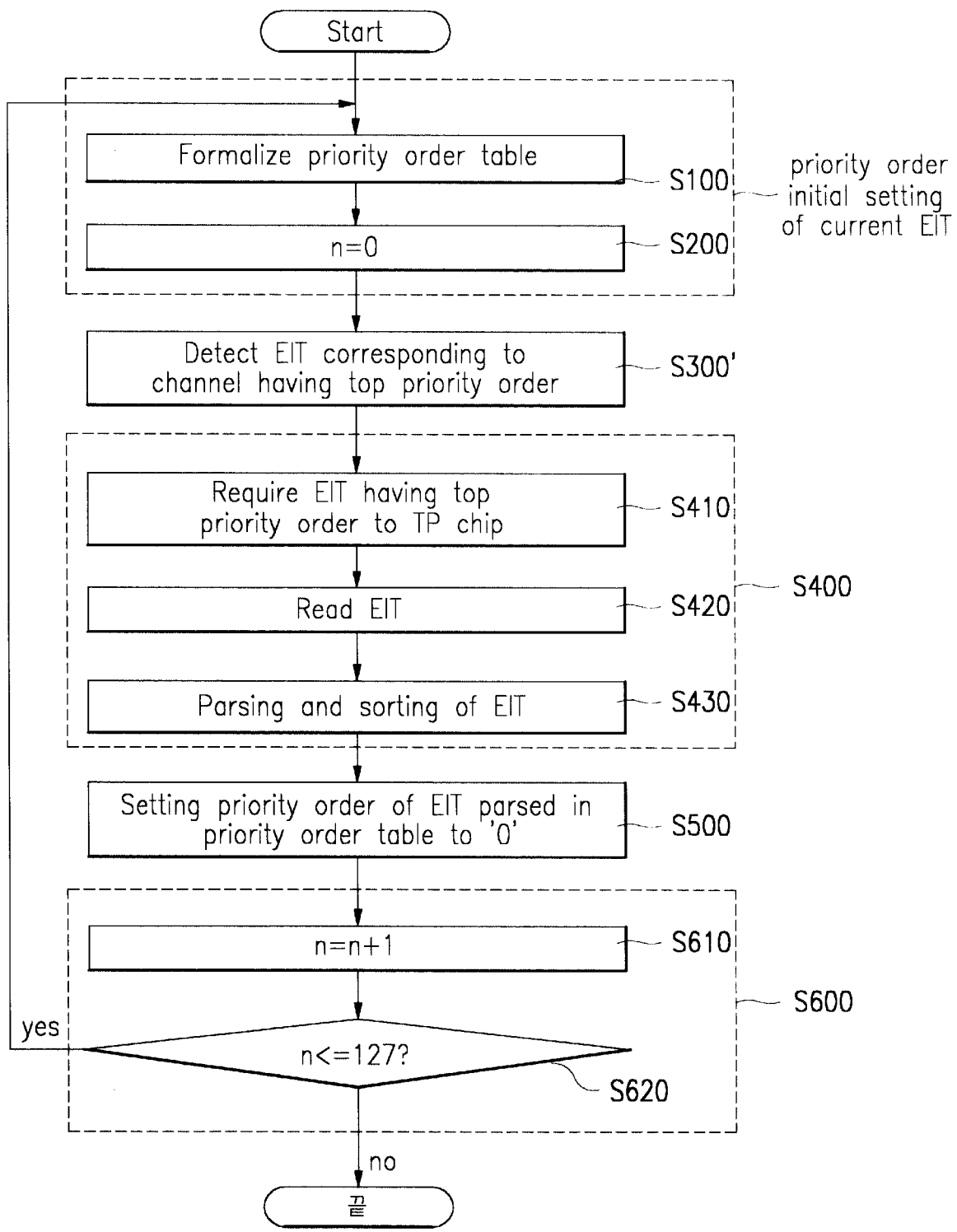

FIG. 4 is a flowchart illustrating a method for parsing EIT, in which the priority is set by prime times, according to the present intention, and contrarily, FIG. 5 is a flowchart illustrating a method for parsing EIT, in which the priority is set by channels, according to the present invention.

First, the program specific information signal sequence is periodically transmitted in the transport stream packet type from a broadcasting station. The program specific information signal sequence is transmitted in the period of 500 ms and updated with new contents every three hours. In other words, the program specific information signal sequence is updated every three hours and transmitted every 500 ms.

In the preferred embodiment of the present invention, the EITs contained in the program specific information signal sequence are extracted, and the extracted EITs are aligned in the order of time. As listed in Table 1, the EITs are aligned in the transmitted order at an initial step and then aligned in the priority order in accordance with the broadcasting time. In Table 1, the 'priority of EIT to be parsed' is given in the EIT transmitted between 00:00 to 03:00. The EIT(1) means the EIT which is set in a first order at the initial step and the EIT(20) means the EIT which is set in a 20th order at the initial step.

TABLE 1

| Time Period | EIT Initial Aligning State | Priority of EIT to be Parsed |
| --- | --- | --- |
| 00:00–03:00 | EIT (0) | 7 |
| 03:00–06:00 | EIT (1) | 10 |
| 06:00–09:00 | EIT (2) | 13 |
| 09:00–12:00 | EIT (3) | 16 |
| 12:00–15:00 | EIT (4) | 19 |
| 15:00–18:00 | EIT (5) | 22 |
| 18:00–21:00 | EIT (6) | 1 |
| 21:00–24:00 | EIT (7) | 4 |
| 00:00–03:00 | EIT (8) | 8 |
| 03:00–06:00 | EIT (9) | 11 |
| 06:00–09:00 | EIT (10) | 14 |
| 09:00–12:00 | EIT (11) | 17 |
| 12:00–15:00 | EIT (12) | 20 |
| 15:00–18:00 | EIT (13) | 23 |
| 18:00–21:00 | EIT (14) | 2 |
| 21:00–24:00 | EIT (15) | 5 |
| 00:00–03:00 | EIT (16) | 9 |
| 03:00–06:00 | EIT (17) | 12 |
| 06:00–09:00 | EIT (18) | 15 |
| 09:00–12:00 | EIT (19) | 18 |
| 12:00–15:00 | EIT (20) | 21 |
| 15:00–18:00 | EIT (21) | 24 |
| 18:00–21:00 | EIT (22) | 3 |
| 21:00–24:00 | EIT (23) | 6 |

Next, the initial priority is set to each EIT in accordance with a predetermined basis(steps S100 and S200). The method for setting the priority order to the each EIT is as follows:

Generally, a TV viewer pays his attention to the broadcasting program on the time when he mainly watches the TV. The time when the viewer intensively watches the TV is a prime time, which is probably between 18:00 to 21:00. Therefore, a top priority is set to the EIT corresponding to the broadcasting programs on the prime time.

Figure 6:
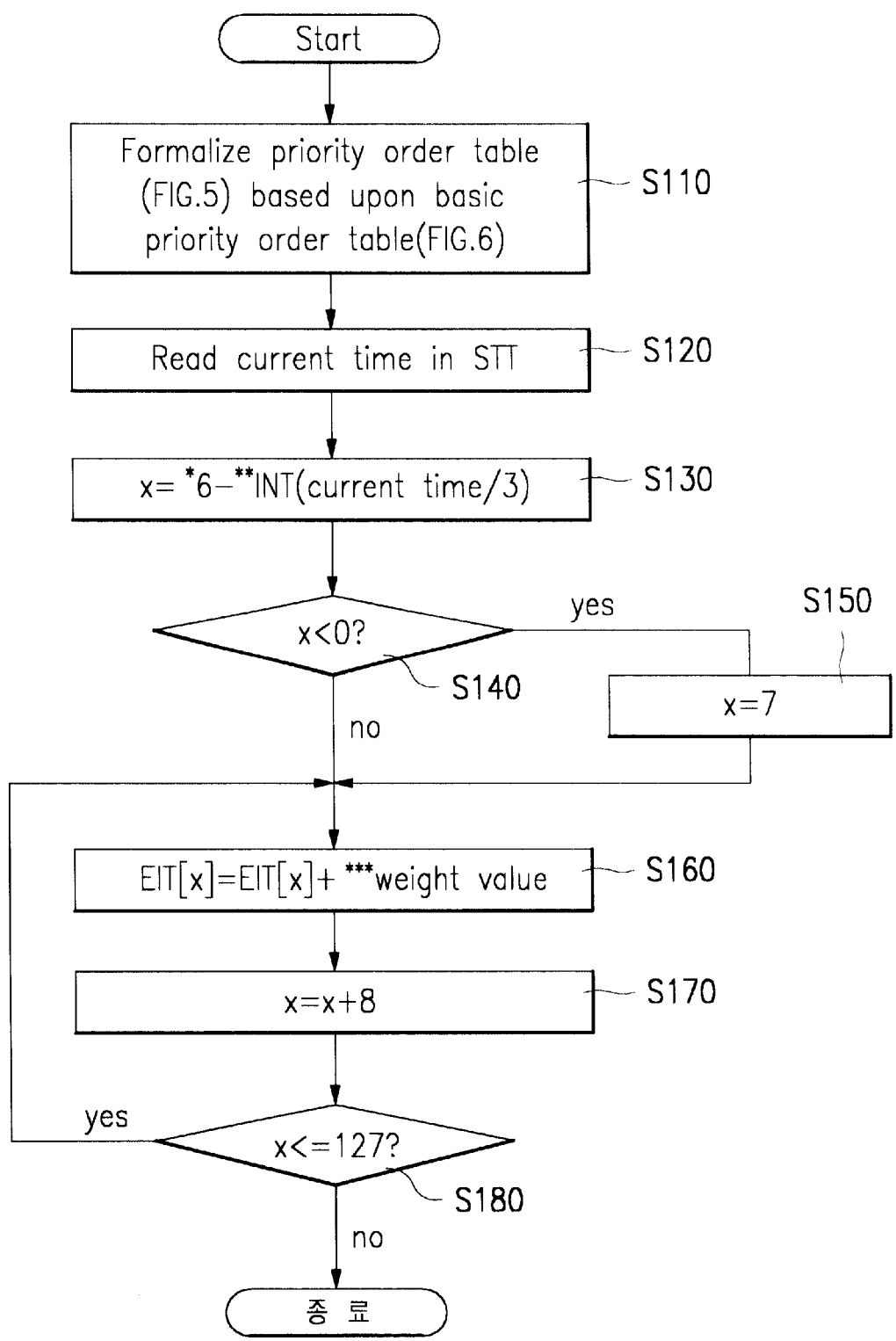
FIG. 6 is a flowchart illustrating a method for setting priority order of the EIT in FIGS. 4 and 5.

There exist several methods for setting the top priority to the broadcasting programs on the prime time. An example thereof is shown in FIG. 6.

The method for setting the priority order to the broadcasting programs comprises the steps of: aligning the EITs by broadcasting times(step S110); detecting current time in 24 tense manner from the STT of the program specific information signal sequence currently received from the TV(step S120); dividing the time value displayed in the 24 tense manner by '3', calculating a natural number in the divided value and subtracting the natural number from a constant '6' to calculate a predetermined priority order value(step S130); and extracting the EIT having an ordinal number as the priority order value from the aligned EITs in the order of time. At this time, if the priority order value is less than '0' (step S140), it is replaced by '7' (step S150). That is, the formula for obtaining the priority order value is as follows:

$$\text{priority value} = 6 - [\text{integral number}\{(\text{current time in 24 hours})/3\}] \quad (1)$$

By way of example, if current time is 4 p.m., that is, 16:00 hours in the 24 tense manner, the divided value by '3', 16/3=5.3333. The integral number of the divided value is '5', and therefore, the calculated final priority order value is '1'.

The reason why the value corresponding to the current time is divided by '3' in the present invention is that the U.S. EIT is edited by three hours. If the EIT is edited by four hours, the division number for the value corresponding to the current time may be changed in the present invention.

If the priority value is '1', the top priority is placed on the first EIT among the aligned current EITs. In other words, if the priority value is '1', the first EIT corresponds to the broadcasting programs on the prime time. This is because the time when the priority value is '1' is between 3 to 6 p.m., that is, 15:00 to 18:00 hours. Next EIT to the transmitted EIT between 15:00 to 18:00 hours is the program specific information corresponding to the broadcasting program on the prime time between 18:00 to 21:00.

If the priority value is '2', the second EIT corresponds to the broadcasting programs on the prime time. This is because the time when the priority value is '2' is between 12 to 3 p.m., that is, 12:00 to 15:00 hours. Next EIT to the transmitted EIT between 12:00 to 15:00 hours corresponds to the broadcasting program between 15:00 to 18:00, and the second EIT is the program specific information corresponding to the broadcasting program on the prime time between 18:00 to 21:00.

If the priority value is '6', the sixth EIT corresponds to the broadcasting program on the prime time. This is because the time when the priority value is '6' is between 0 to 3 a.m., that is, 00:00 to 03:00 hours. Next EIT to the transmitted EIT between 00:00 to 03:00 hours corresponds to the broadcasting program between 03:00 to 06:00, the second EIT corresponds to the broadcasting program between 06:00 to 09:00, and the sixth EIT is the program specific information corresponding to the broadcasting program on the prime time.

If current time is between 9 to 12 p.m., that is, 21:00 to 24:00 hours, the priority value is less than '0'. If the calculated priority value is less than '0', it is set as '7' in the present invention and the seventh EIT is extracted and parsed. In this case, if the current time is between 21:00 to 24:00 hours, the prime time has already elapsed, so the EIT on the prime time on the corresponding day does not attract any attention to the viewer. Therefore, in the case where the prime time elapses, it is desirable that the EIT corresponding to the broadcasting programs on the prime time on the next day is extracted and parsed. To this end, if the priority value is less than '0', it is replaced by '7'. If the current time is between 21:00 to 24:00 hours, the seventh EIT from the transmitted EIT on that time corresponds to the broadcasting program to be broadcast on the prime time on the next day.

A weight value is set to the EIT having the priority order value, and the priority order is updated(step S160). If the priority order value is defined according to the above process, the eighth EIT at the initial step is extracted to set the priority order of the EIT corresponding to the next day(step S170).

Finally, it is checked whether the priority order on the received all EITs is set(step S180).

The method for checking as to whether the priority order on all EITs is set is as follows:

Firstly, a predetermined coefficient value is initialized (step S200). Secondly, priority order is set to a predetermined EIT(step S400), and thereby, the coefficient value increases(step S610). Thirdly, it is determined whether the coefficient value is greater than 127(step S620), and if it is greater than 127, it is determined that the priority order on all EITs has been set.

Figure 7:
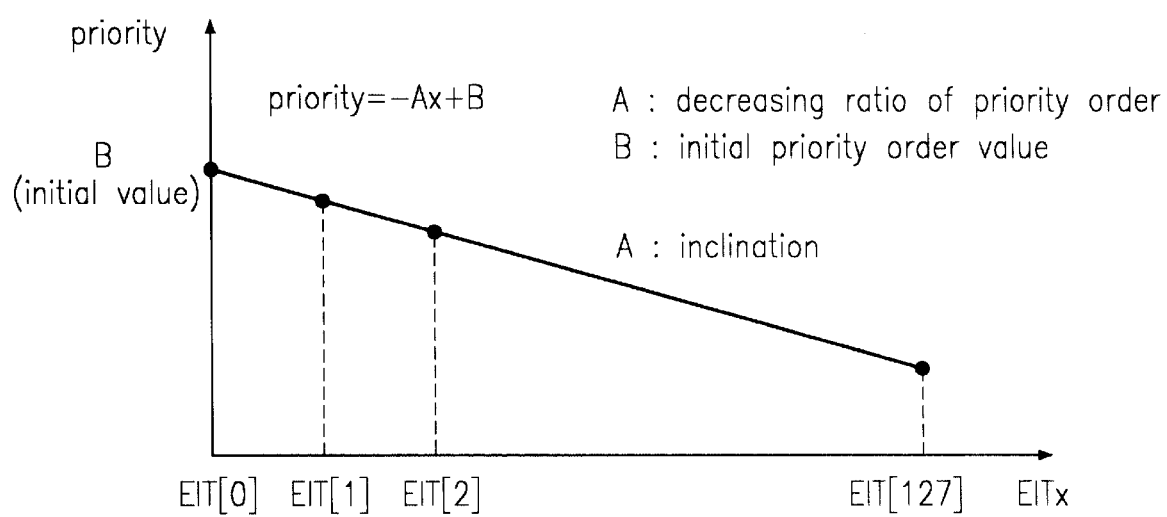
FIG. 7 is a graph illustrating the variation of priority order values of the EITs at which the priority order is set.

If the priority order is set on each EIT, the EIT placed on top priority is firstly detected(step S410). Next, the EIT on the top priority is read(step S420) and parsed, and data on the parsed EIT is provided to the viewer(step S430). FIG. 7 is a graph illustrating the variation of priority values of the EITs at which the priority order is set.

Finally, the parsed EIT is removed in the next parsing object(step S500), and it is then checked that the currently received EIT is all parsed(step S600). FIG. 7 shows the slow decrement on the priority values of each EIT.

In the present invention, the priority order of each EIT is set by broadcasting time periods, but may be of course set by broadcasting channels based upon the taste of the viewer. FIG. 5 is a flowchart illustrating the parsing of the priority of EIT corresponding to the favorite channel of the viewer, which is almost similar to that in FIG. 4 but differs in that the step S300 in FIG. 4 is changed to the step S300' where the EIT corresponding to the channel having top priority is searched.

In other words, if the favorite channel of the viewer is 'No. 7', the EIT on the programs of the channel 7 is firstly parsed and provided to the viewer. Therefore, the viewer selects the programs on his favorite channel and is guided by the selected program.

As discussed above, a method for parsing EIT according to the present invention can assign a predetermined priority on each EIT by the tastes of a viewer or by broadcasting time periods, when compared with the conventional EIT parsing method, and parse the EIT depending upon the assigned priority to thereby provide the parsed result to the viewer. Thereby, the desired broadcasting program or the broadcasting program on the prime time can be primarily guided to the viewer. As a result, the present invention has an advantage in that the information on the broadcasting program on the prime time can be provided to the viewer at a rapid speed.

It will be apparent to those skilled in the art that various modifications and variations can be made in a method for parsing EIT of the present invention without departing from the spirit or scope of the invention. Thus, it is intended that the present invention cover the modifications and variations of this invention provided they come within the scope of the appended claims and their equivalents.

What is claimed is:

1. A method for parsing event information tables (EITs), comprising the steps of:
   extracting the EITs from a program specific information signal sequence in a transport stream packet transmitted from a broadcasting station;
   parsing each EIT in a prescribed priority order, wherein the prescribed priority order is determined by:
      extracting a prime EIT corresponding to a time period when an audience rating is highest among the EITs received sequentially; and
      sorting the prime EITs in the order of date; and
   displaying the parsed EIT on a TV screen.

2. The method defined in claim 1, further comprising the step of:
   aligning the extracted EITs in the order of time during said step of displaying the parsed EIT on a TV screen.

3. The method defined in claim 1, wherein the time period when the audience rating is highest is between 6 to 9 p.m.

4. The method defined in claim 1, wherein the step of extracting the prime EIT comprises the steps of:
   detecting a current time in a 24 hour format;
   rounding the detected time to form a first integral number, and dividing the first integral number by '3' to calculate a divided value, and rounding the divided value to form a second integral number;
   subtracting the second integral number from '6' to obtain a subtracted value, setting a priority order value equal to the subtracted value, unless the subtracted value is less than '0', if the subtracted value is less than zero, setting the priority order value to '7'; and
   extracting the EIT having an ordinal number as the priority order value from the aligned EITs in the order of time.

5. A method for parsing event information tables (EITs), comprising the steps of:
   extracting the EITs from a program specific information signal sequence in a transport stream packet transmitted from a broadcasting station;
   parsing each EIT in a prescribed priority order, wherein the prescribed priority order is determined by:
      extracting a favorite EIT, corresponding to a favorite time period arbitrarily set by a viewer, among the EITs received sequentially; and
      sorting the favorite EITs in the order of date; and
   displaying the parsed EIT on a TV screen.

6. The method defined in claim 5, wherein the step of extracting the favorite EIT comprises the steps of:
   detecting a current time in a 24 hour format;
   rounding the detected time to form a first integral number, and dividing the first integral number by '3' to calculate a divided value, and rounding the divided value to form a second integral number;
   subtracting the second integral number from a favorite value, arbitrarily set by the viewer, to obtain a subtracted value, setting a priority order value equal to the subtracted value, unless the subtracted value is less than '0', if the subtracted value is less than zero, setting the priority order value to '7'; and
   extracting the EIT having an ordinal number as the priority order value from the aligned EITs in the order of time.

7. The method defined in claim 5, further comprising the step of:
   aligning the extracted EITs in the order of time during said step of displaying the parsed EIT on a TV screen.

8. The method defined in claim 5, wherein the step of parsing the EIT comprises the steps of:
   detecting a top priority EIT;
   parsing the detected top priority EIT;
   storing the parsed top priority EIT;
   determining whether all of the EITs are parsed; and
   if not parsed, repeating the above steps excepting the stored EIT.

9. The method defined in claim 5, further comprising the step of:
   displaying a predetermined message on a portion of the TV screen where a yet-to-be parsed EIT will be displayed, wherein the predetermined message indicates that an EIT has not yet been processed.

10. The method defined in claim 1, wherein the step of parsing the EIT comprises the steps of:
    detecting a top priority EIT;
    parsing the detected top priority EIT;
    storing the parsed top priority EIT;
    determining whether all of the EITs are parsed; and
    if not parsed, repeating the above steps excepting the stored EIT.

11. The method defined in claim 1, further comprising the step of:

displaying a predetermined message on a portion of the TV screen where a yet-to-be parsed EIT will be displayed, wherein the predetermined message indicates that an EIT has not yet been processed.

12. A method for parsing event information tables (EITs), comprising the steps of:

extracting the EITs from a program specific information signal sequence in a transport stream packet transmitted from a broadcasting station;

parsing each EIT in a prescribed priority order, wherein the prescribed priority order is determined by:
    extracting a favorite channel EIT, corresponding to a favorite broadcasting channel of a viewer, among the EITs received sequentially; and
    sorting the favorite channel EITs; and displaying the parsed EIT on a TV screen.

13. The method defined in claim 12, further comprising the step of:

aligning the extracted EITs in the order of time during said step of displaying the parsed EIT on a TV screen.

14. The method defined in claim 12, wherein the step of parsing the EIT comprises the steps of:

detecting a top priority EIT;

parsing the detected top priority EIT;

storing the parsed top priority EIT;

determining whether all of the EITs are parsed; and if not parsed, repeating the above steps excepting the stored EIT.

15. The method defined in claim 12, further comprising the step of:

displaying a predetermined message on a portion of the TV screen where a yet-to-be parsed EIT will be displayed, wherein the predetermined message indicates that an EIT has not yet been processed.

16. A method for parsing event information tables(EITs), comprising the steps of:

extracting the EITs from a program specific information signal sequence in a transport stream packet transmitted from a broadcasting station;

parsing each EIT in a prescribed priority order by:
    detecting a top priority EIT;
    parsing the detected top priority EIT;
    storing the parsed top priority EIT;
    determining whether all of the EITs are parsed; and
    if not parsed, repeating the above steps excepting the stored EIT; and displaying the parsed EIT on a TV screen.

17. The method defined in claim 16, further comprising the step of:

aligning the extracted EITs in the order of time during said step of displaying the parsed EIT on a TV screen.

18. The method defined in claim 16, further comprising the step of:

displaying a predetermined message on a portion of the TV screen where a yet-to-be parsed EIT will be displayed, wherein the predetermined message indicates that an EIT has not yet been processed.

19. A method for parsing event information tables (EITs), comprising the steps of:

extracting the EITs from a program specific information signal sequence in a transport stream packet transmitted from a broadcasting station;

parsing each EIT in a prescribed priority order;

displaying the parsed EIT on a TV screen; and displaying a predetermined message on a portion of the TV screen where a yet-to-be parsed EIT will be displayed, wherein the predetermined message indicates that an EIT has not yet been processed.

20. The method defined in claim 19, further comprising the step of:

aligning the extracted EITs in the order of time during said step of displaying the parsed EIT on a TV screen.

* * * * *